Feb. 6, 1951 L. E. HEY ET AL 2,540,880
VIBRATION DAMPER
Filed Feb. 9, 1946 3 Sheets-Sheet 1

INVENTORS
LESTER E. HEY.
ARTHUR N. LILLENAS.
IRVING MENDELSON.
BY
ATTORNEY

Feb. 6, 1951 L. E. HEY ET AL 2,540,880
VIBRATION DAMPER
Filed Feb. 9, 1946 3 Sheets-Sheet 2
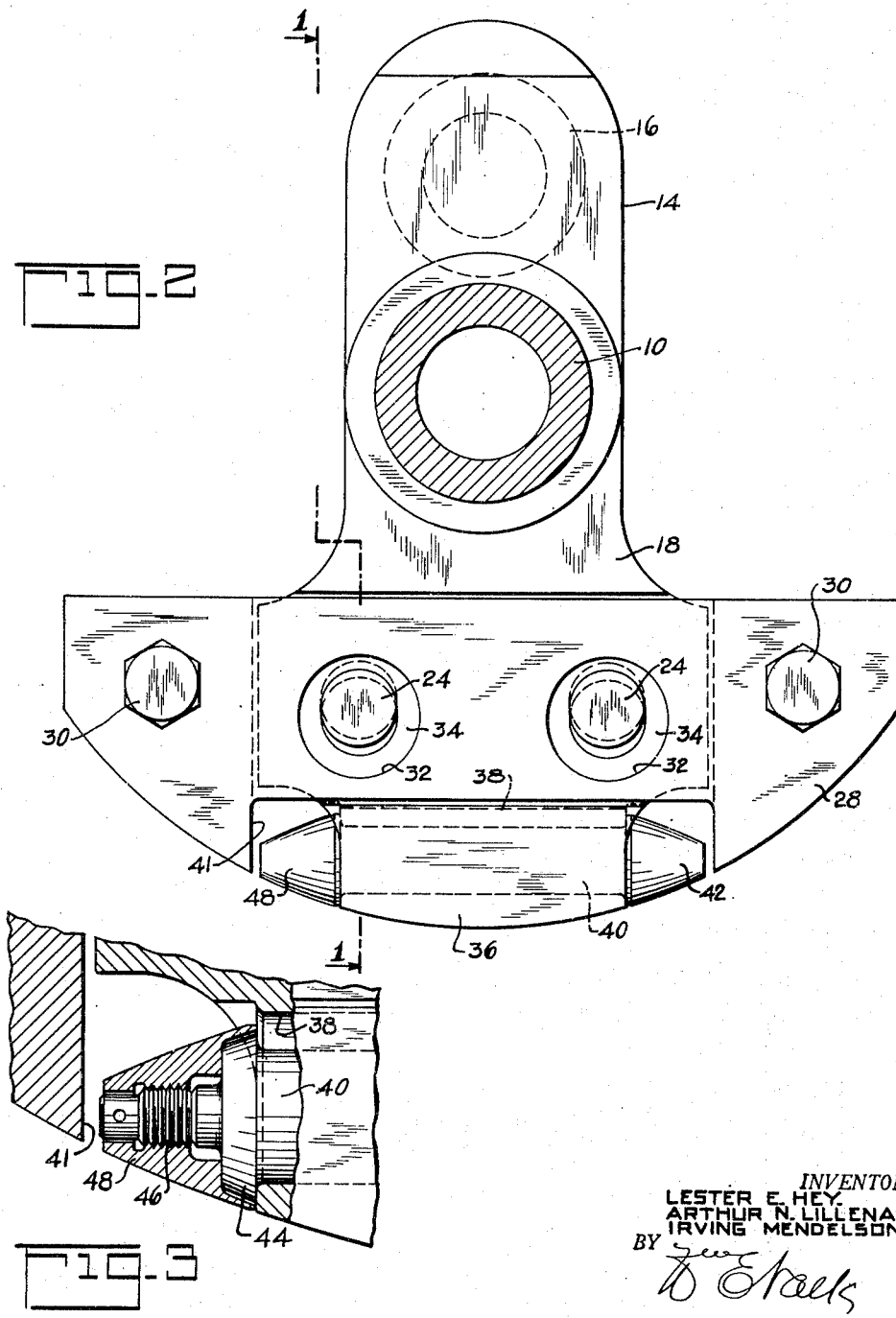
INVENTORS
LESTER E. HEY.
ARTHUR N. LILLENAS.
IRVING MENDELSON.
BY
ATTORNEY

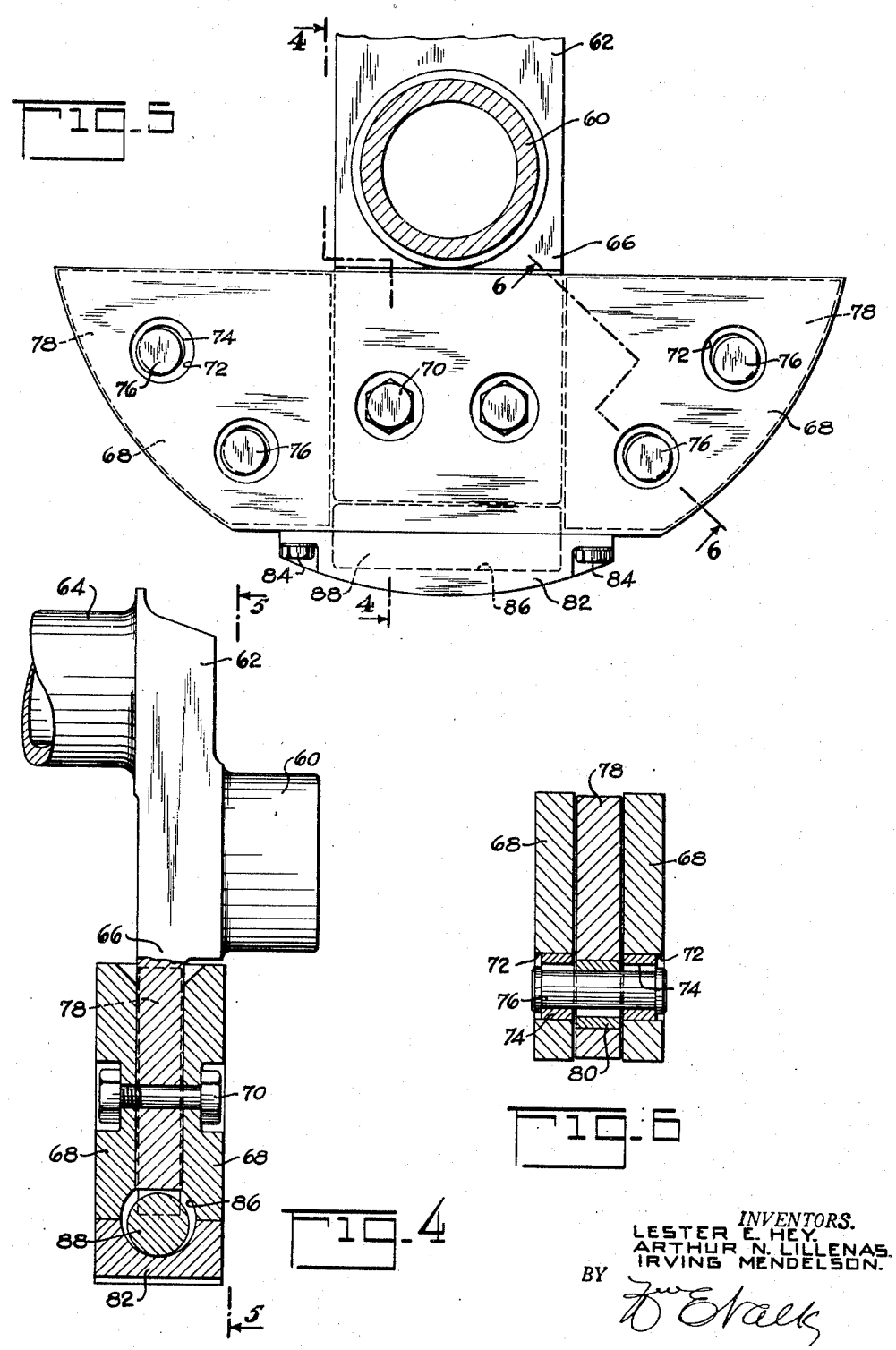

Patented Feb. 6, 1951

2,540,880

UNITED STATES PATENT OFFICE 2,540,880

VIBRATION DAMPER

Lester E. Hey, Paterson, N. J., Arthur N. Lillenas, Minneapolis, Minn., and Irving Mendelson, Paterson, N. J., assignors to Wright Aeronautical Corporation, a corporation of New York Application February 9, 1946, Serial No. 646,536

3 Claims. (Cl. 74—604)

This invention relates to centrifugal pendulums for damping vibrations of a rotating member and is particularly directed to means for damping both torsional and axial vibrations of the rotating member.

Aircraft engine crankshafts are generally provided with devices for damping crankshaft torsional vibrations. Such a damping device is disclosed in Patent No. 2,112,984 to R. Chilton. As disclosed in this patent, a crankshaft counterweight is mounted on a lateral crankshaft extension for pendular movement with respect to said extension about axes parallel to but spaced from the crankshaft axis. The counterweight support comprises a pair of spaced rollers disposed in holes each having a diameter larger than that of said rollers, said holes being formed in both said crankshaft extension and said counterweight, whereby said holes provide cylindrical tracks for the rollers for supporting the counterweight against the centrifugal forces acting thereon during crankshaft rotation. With this construction, the counterweight has a pendular bi-filar support and comprises a centrifugal pendulum with the properties of simple pendulum having a length equal to the difference in diameter between said rollers and said holes. This pendulum is designed so that the counterweight is effective to dampen torsional crankshaft vibrations of a particular frequency per crankshaft revolution.

It has been found that engine crankshafts may also be subject to bending vibrations which tend to cause vibrations of the lateral crankshaft extension and the counterweight in a direction parallel to the axis of the crankshaft. Should these crankshaft bending vibrations become synchronous with the natural frequency of vibration of the crankshaft in an axial direction, failure of the crankshaft may occur. Also, since the counterweight and crankshaft extensions are necessarily provided with some axial clearance, axial vibration of the counterweight causes sliding of the counterweight rollers relative to their tracks, thereby causing wear and scuffing of the rollers and/or their tracks.

It is an object of this invention to provide means to dampen axial vibrations of the internal crankshaft extension and counterweight, whether caused by crankshaft bending or some other reason, and in addition to dampen the crankshaft torsional vibrations. To this end, the lateral crankshaft extension on which the torsional vibration damping means is mounted is provided with a cylindrical track in which is mounted a cylindrical roller having a smaller radius than that of said track, the axis of said track being offset from and disposed at right angles to the axis of the crankshaft.

Other objects of this invention will become apparent upon reading the annexed detailed description in connection with the drawing in which:

Figure 2 is an end view of the crankshaft taken along line 2—2 of Figure 1;

Figure 3 is a sectional view of a portion of Figure 2;

Figure 4 is a view taken along line 4—4 of Figure 5 and is similar to Figure 1 but illustrates a modification;

Figure 5 is an end view of Figure 4 as viewed along line 5—5 of Figure 4; and

Figure 6 is a sectional view taken along line 6—6 of Figure 5.

Figure 1:
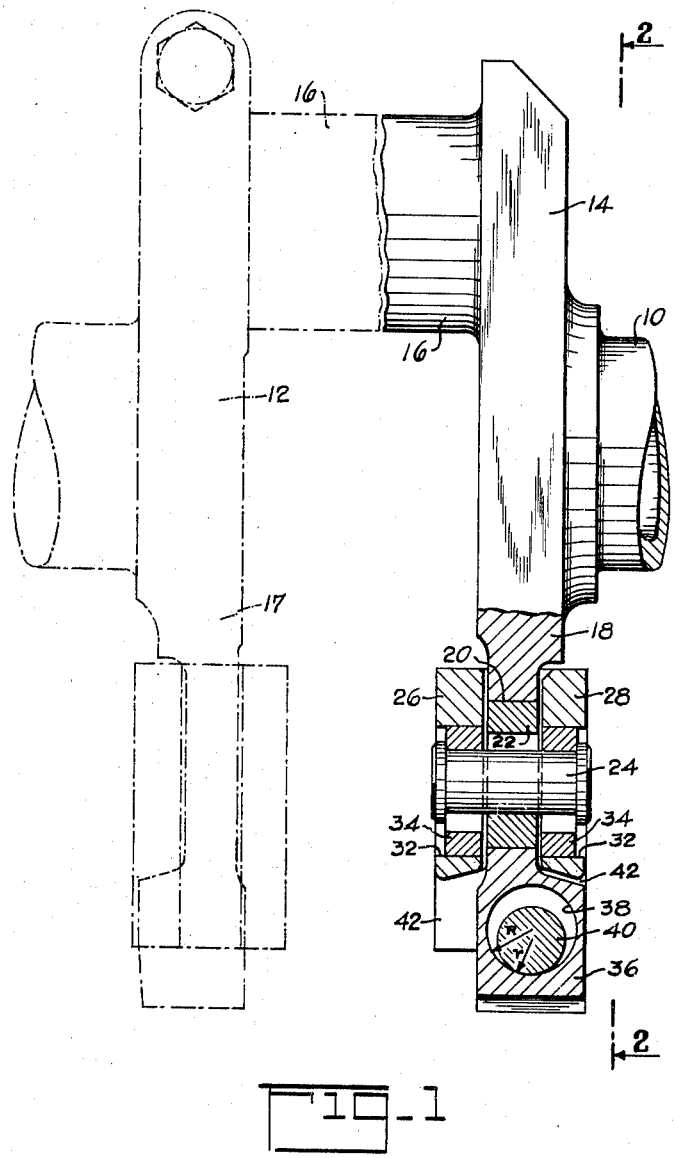
Figure 1 is a side view partly in section of a crankshaft embodying the invention and taken along line 1—1 of Figure 2.

The invention is herein described in connection with a crankshaft but, as will appear, the invention is generally applicable to rotating members for damping their torsional and axial vibrations.

Referring first to Figures 1 to 3, a crankshaft 10 is provided with a pair of crankcheeks 12 and 14 and a crankpin 16 is disposed therebetween. The crankcheek 14 is formed integral with a crankpin 16 while the crankcheek 12 is clamped thereto, as is conventional practice. The crankcheeks otherwise may be similar.

As illustrated, crankcheeks 12 and 14 have portions 17 and 18 extending laterally from the crankshaft from the side opposite the crankpin 16. The crankshaft extension 18 is provided with a pair of spaced bores 20 in which bushings 22 are secured. The bores of the bushings 22 comprise cylindrical tracks in which cylindrical pins 24 are disposed. The pins 24 each have a diameter smaller than the interior of the bushings 22 and extend beyond both ends of the bushings.

A pair of counterweight members 26 and 28 are rigidly secured together by bolts 30 about the crankshaft extension 18 which extends between the counterweight members in clearance relation thereto. Each counterweight is provided with a pair of bores 32 having a spacing equal to the spacing of the bores 20 with the bushings 34 secured therein. The bushings 22 and 34 have the same internal diameter. With this construction, upon crankshaft rotation, the counterweight 26, 28 is urged outwardly by the centrifugal force acting thereon so that the pins 24 rollably engage the portion of the cylindrical interior of the bushing 22 facing inwardly toward the crankshaft axis and the outwardly facing portions of the cylindrical interior of bushings 34. That is, the pins 24, rollably engage a cylindrical track formed in the crankshaft extension 18 by the bushing 22 and facing inwardly toward the crankshaft axis and also rollably engage outwardly facing cylindrical tracks formed in the counterweight 26, 28 by the bushings 34. Accordingly, the pins 24 provide a pendular bifilar support for the counterweight structure 26, 28 from the crankshaft extension 18. The construction so far described is generally similar to the centrifugal pendulum disclosed in the aforementioned patent to R. Chilton. As disclosed in said patent, the difference in the diameters of the pins 24 and bushings 22 may be designed so that during crankshaft rotation the pendular oscillations of the counterweight structure 26, 28 dampens torsional crankshaft vibrations of a particular frequency per revolution of a crankshaft.

It has been found that in certain aircraft engines, the crankshaft is subject to bending vibrations which tend to cause vibration of the crankshaft extensions 17 and 18 in a direction parallel to the crankshaft axis. Should these axial vibrations become synchronous with the natural frequency of vibration of the crankshaft in this axial direction, failure of the counterweight structure may occur. Also, since the counterweight and associated crankshaft extension are provided with some axial clearance, axial vibrations of the counterweight causes wear and scuffing of the counterweight supporting rollers and/or their tracks.

In accordance with the present invention, axial vibrations of the counterweight structure 26, 28 is damped by providing a centrifugal pendulum on the crankshaft extension 18 with its axis disposed at right angles to the axis of the crankshaft 10. To this end, the crankshaft extension 18 has an enlarged outer end 36 provided with a bore 38 having a radius R and a cylindrical roller 40 disposed within the bore 38 has a radius r smaller than the radius R. The axis of the bore 38 is spaced from and disposed at right angles to the axis of the crankshaft 10. The counterweights 26 and 28 are cut back at 41 to clear the enlarged end 36 of the crankshaft extension 18.

Upon rotation of the crankshaft 10, the centrifugal force acting on the roller 40 holds the roller outwardly against the surface of the bore 38 facing inwardly toward the crankshaft axis. Accordingly, axial vibrations of the crankshaft extension 18 result in pendular vibration of the roller 40 on the outer cylindrical surface of the track provided by the bore 38, the difference between the radii r and R respectively of the roller 40 and track 38 determining the effective length of the centrifugal pendulum.

In this way, the centrifugal pendulum provided by the mass or roller 40 may be tuned to the frequency per crankshaft revolution of the main axial vibrations of the crankshaft extension 18 with the result that the pendular oscillations of the roller 40 dampen these axial vibrations.

One end of the roller 40 is provided with an enlarged head 42 rigid therewith and having a diameter larger than the bore 38. The other end of the roller has a flange 44 which is adapted to pass through the bore 38. This latter end of the roller is provided with a threaded stem 46 to which is secured a nut 48 having a diameter larger than the bore 38 thereby positively preventing the roller 40 from sliding out of the bore 38. During crankshaft rotation, the roller 40 is held outwardly within the bore 38 by the centrifugal force acting on the roller and therefore the roller is held against axial displacement relative to the bore 38 by the integral head 42 at one end and by the flange 44 at the other end. Accordingly, the threaded nut does not carry any of the axial forces on the roller. Also, as illustrated, the nut 48 and head portion 42 are profiled to correspond to the profile of the outer edge of the counterweight structure.

Preferably, the crankcheek extension 17 is provided with torsional and axial vibration damping means similar to that disclosed in connection with the crankshaft extension 18.

Figures 4 to 6 illustrate a modification of the aforedescribed damper structure. In this modification, a crankshaft 60 is provided with a crankcheek 62 having a crankpin 64 extending therefrom. The crankcheek 62 also has a portion 66 extending laterally from the crankshaft from the side opposite to the crankpin 64. A pair of counterweight plates 68 are rigidly secured on opposite sides of the crankshaft extension 66 by bolts 70. The ends of the plate 68 projecting beyond the side edges of the crankshaft extension 66 and each end of a plate 68 is provided with a pair of spaced bores 72 alined with corresponding bores in the other of the plates 68. Bushings 74 are secured within the bore 72 and pins 76, having a smaller radius than the internal radius of the bushings 74, extend between and into the alined bushings 74. The counterweight members 78 are provided with bushings 80 having an internal radius equal to the internal radius of the bushings 74 and the pins 76 extending through the bushings 80 to support the counterweight members 78. In this way, the counterweight members 78 each comprise a centrifugal pendulum in which the pins 76 provide a pendular bi-filar support from the crankshaft extension 66 for the counterweight members 78. As in Figures 1 to 3, the relative magnitude of the radius of the pins 76 and the internal radius of the bushings 74 and 80 may be designed so that during crankshaft rotation, pendular oscillations of the counterweight members 78 dampen torsional crankshaft vibrations of a particular frequency per crankshaft revolution. Also, the pins 76 and the internal radius of the bushings 74 and 80 for one of the counterweight members 78 may be designed to dampen crankshaft torsional vibrations of one frequency per crankshaft revolution and for the other counterweight member they may be designed to dampen crankshaft torsional vibrations of another frequency per crankshaft revolution.

In addition, a counterweight member 82 is rigidly secured to the plates 68 by bolts 84. The member 82 is provided with a cylindrical groove 86 which, as illustrated, is approximately equal in length to the width of the crankshaft extension 66 and is disposed adjacent the outer edge of said extension. A cylindrical roller 88 is disposed within the cylindrical groove 86 before the counterweight member 82 is secured in position by the bolts 84, the roller 88 having a diameter less than the diameter of the cylindrical groove 86. With this construction, during crankshaft rotation, the roller 88 will act as a centrifugal pendulum to dampen axial vibrations of the crankshaft extension 66 and associated counterweight structure.

With both of the aforedescribed modifications, the crankshaft extension is provided with a centrifugal pendulum for damping its torsional vibrations and with a centrifugal pendulum for damping its axial vibrations. The torsional vibration damping means comprises masses 26 and 28 in Figures 1 to 3 and masses 78 in Figures 4 to 6 carried by their associated crankshaft extensions for oscillation of each portion of these masses in a plane perpendicular to the axis of their crankshafts. The axial vibration damping means comprise a mass 40 in Figures 1 to 3 and a mass 88 in Figures 4 and 5 carried by their associated crankshaft extensions for oscillation of each portion of said masses in a plane parallel to the axis of their crankshafts. Also, the arrangement is such that the space occupied by the combined torsional and axial vibration damping means is very little greater, if any, than the space occupied by the conventional torsional damping means such as disclosed in the aforementioned patent to R. Chilton. This latter feature is quite important since it permits the vibration damping means of the present invention to be readily substituted for the torsonal vibration damping means of the prior art.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination, a rotatable shaft having a lateral extension, said extension having a flat portion disposed in a plane at right angles to the axis of said shaft, a pair of members secured to said extension on opposite sides of its said flat portion and projecting beyond the side edges of said extension, a first mass disposed between said members beyond one of said side edges, said first mass having a pair of spaced openings therethrough, a pair of pins each extending through one of said openings and projecting from both ends thereof into alined openings in said members, said openings having a diameter larger than that of said pins whereby said first mass is rollably supported from said members, a second mass supported between said members in a manner similar to said first mass but beyond the opposite side edge of said extension, a cylindrical track formed between said members radially outwardly of said shaft extension and at right angles to the axis of said shaft, and a third mass comprising a roller mounted for rolling action on said track.

2. In combination; a rotatable shaft having a lateral extension; a pair of members secured to said extension on opposite sides thereof, said members projecting beyond the side edges of said extension in a direction transverse to the axis of said shaft; a first mass disposed between said members beyond one of said side edges, said first mass having a pair of spaced openings therethrough; a pair of pins each extending through one of said openings and projecting from both ends thereof into alined openings in said members, said openings having a diameter larger than that of said pins whereby said first mass is rollably supported from said members; a second mass supported between said members in a manner similar to said first mass but beyond the opposite side edge of said extension; means carried by said members forming a cylindrical track radially outwardly of said shaft extension with the axis of said track disposed transverse to the axis of said shaft; and a third mass comprising a roller mounted for rolling action on said track.

3. In combination; a rotatable shaft having a lateral extension; a pair of members secured to said extension on opposite sides thereof, said members projecting beyond the side edges of said extension in a direction transverse to the axis of said shaft; a first mass disposed between said members beyond one of said side edges; means providing a pendular bi-filar support for said first mass from said members for oscillation of said mass between said members in a plane transverse to the axis of said shaft; a second mass supported between said members in a manner similar to said first mass but beyond the opposite side edge of said extension; means carried by said extension forming a cylindrical track radially outwardly of said shaft extension with the axis of said track disposed transverse to the axis of said shaft; and a third mass comprising a roller mounted for rolling action on said track.

LESTER E. HEY.
ARTHUR N. LILLENAS.
IRVING MENDELSON.

REFERENCES CITED

The following references are of record in the file of this patent:

UNITED STATES PATENTS

| Number | Name | Date |
|---|---|---|
| 2,103,643 | Salomon | Dec. 28, 1937 |
| 2,137,591 | Sarazin | Nov. 22, 1938 |
| 2,239,078 | Chilton | Apr. 22, 1941 |
| 2,285,072 | Zdanowich | June 2, 1942 |
| 2,349,187 | Meyer | May 16, 1944 |

FOREIGN PATENTS

| Number | Country | Date |
|---|---|---|
| 832,405 | France | June 27, 1938 |